United States Patent

[11] 3,601,201

[72] Inventor Vincent O. Schmitz
 Rte. 1, Clear Lake, Iowa 50428
[21] Appl. No. 774,979
[22] Filed Nov. 12, 1968
[45] Patented Aug. 24, 1971

[54] PLOW COLTER
 4 Claims, 5 Drawing Figs.
[52] U.S. Cl. .................................................. 172/269,
 172/705
[51] Int. Cl. ....................................................... A01b 61/00
[50] Field of Search .......................................... 172/144,
 166, 269, 572, 602

[56] References Cited
 UNITED STATES PATENTS
 762,583  6/1904  Hardiman ..................... 172/269 X
3,061,018 10/1962  Olson .......................... 172/602 X
3,319,589  5/1967  Moran .......................... 172/166 X
3,351,139 11/1967  Schmitz et al. ............... 172/602

3,411,589 11/1968  Moe ............................. 172/572
3,451,489  6/1969  Sullivan ....................... 172/572

Primary Examiner—Robert E. Pulfrey
Assistant Examiner—Stephen C. Pellegrino
Attorney—Zarley, McKee & Thomte ABSTRACT: A plow colter assembly including a vertically disposed first shaft adapted to be operatively connected to the horizontally disposed plow beam and having a hollow bearing secured to and spaced from the first shaft. The second shaft is rotatably mounted in the bearing means and has a disc support arm operatively pivotally secured thereto which extends downwardly and rearwardly therefrom. A spring-loaded locking means yieldably maintains the disc support arm in an operative pivotal position with respect to the second shaft. The locking means is overcome or disengaged when the disc strikes a rock or the like to permit the disc support arm to pivot upwardly so that the disc will pass over the rock without damaging the colter assembly. The spring-loaded locking means returns the disc support arm to its operative position when the disc has passed over the rock.

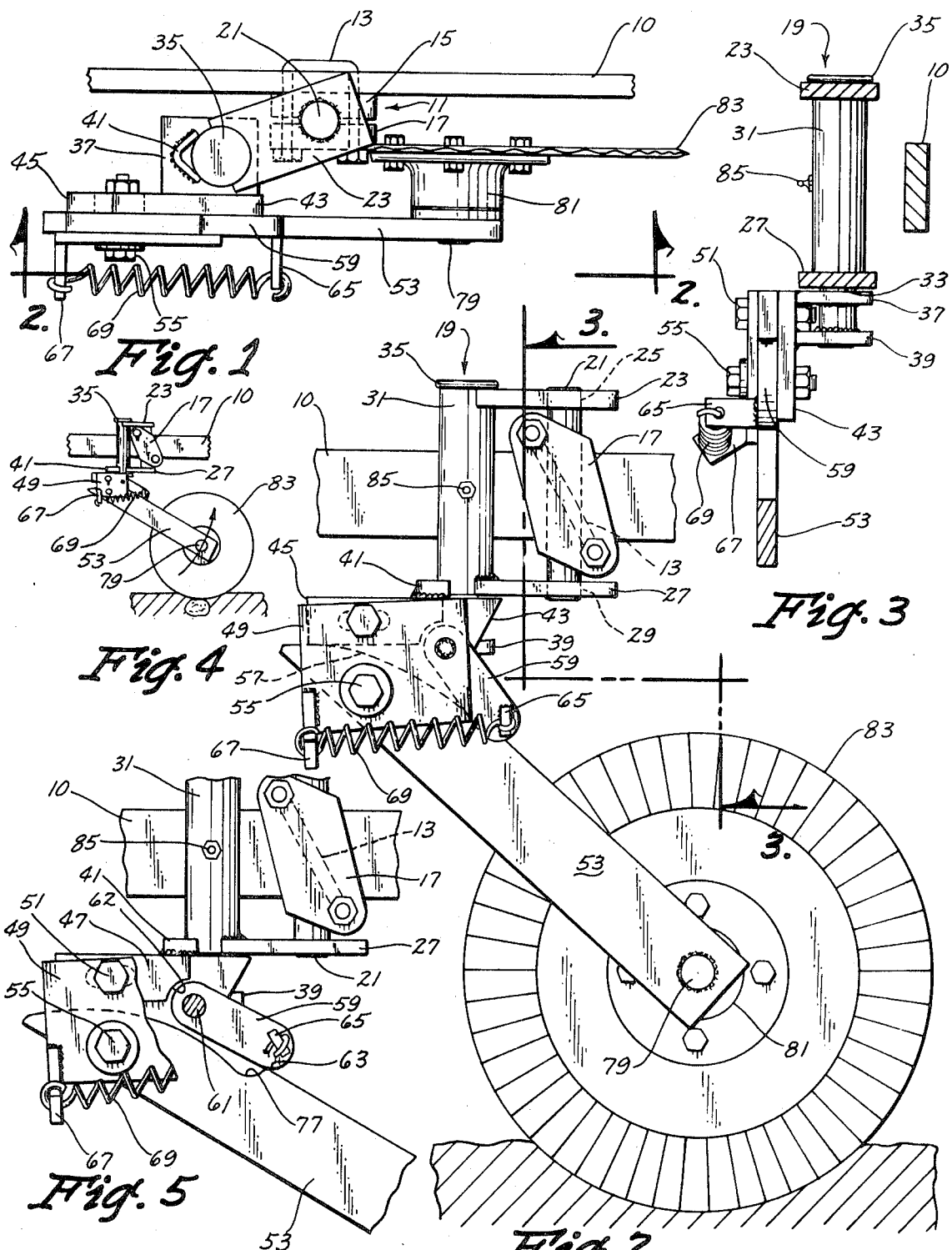

PLOW COLTER

Plow colters have long been used to cut the ground in advance of the plowshare. These colters are easily attached to a plow beam and extend downwardly therefrom. When the plow is being used in an area of long straw, weeds, cornstalks or the like, the colters frequently become plugged. The plow colters also have a tendency to break or bend when the disc member of the colter strikes a foreign object. Applicant is coinventor of an improved plow colter and which has been granted U.S. Pat. No. 3,351,139 which issued on Nov. 7, 1967. The plow colter disclosed in said patent included a shearpin means which would be sheared when the colter disc struck a foreign object such as a rock or the like. The colter described in said patent worked extremely well but it was found to be somewhat of a nuisance to constantly replace the shearpins upon breakage thereof which necessarily resulted in a loss of plowing time.

Therefore, it is a principal object of this invention to provide a plow colter which will not become plugged with foreign material.

A further object of this invention is to provide a plow colter having a spring-loaded locking means to prevent damage to equipment upon the striking of a foreign object.

A further object of this invention is to provide a plow colter wherein the disc-supporting arm has a spring-loaded locking means associated therewith which permits the disc and arm to raise over a rock or the like and which returns the disc and arm to an operative position.

A further object of this invention is to provide a plow colter which may be readily secured to a variety of plows regardless of make or type.

A further object of this invention is to provide a plow colter which permits vertical and horizontal adjustment thereof with respect to the plow share.

A further object of this invention is to provide a plow colter which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a top view of the plow colter;

FIG. 2 is a side view of the plow colter secured to the horizontal plow beam as would be seen along lines 2—2 of FIG. 1;

FIG. 3 is a sectional view as seen along lines 3—3 of FIG. 2;

FIG. 4 is a side view of the plow colter illustrating the disc raising upwardly over a foreign object such as a rock; and FIG. 5 is a fragmentary side view of the plow colter illustrating the disengagement of the locking means.

The numeral 10 generally designates a horizontal beam of a conventional plow. A conventional colter clamp 11 is secured to beam 10 by a U-bolt 13 and is comprised of clamp members 15 and 17.

The plow colter of this invention is generally designated by the reference numeral 19 and is detachably secured to beam 10 by means of clamp 11 as seen in the drawings. The numeral 21 refers to a vertically disposed shaft having reduced diameter portions at its upper and lower ends. Bar 23 having an opening 25 formed therein is secured to shaft 21 by means of the upper reduced diameter portion thereof being received by opening 25 and being welded as seen in FIG. 2. A bar 27 having an opening 29 formed therein is secured to the lower end of shaft 21 by means of the lower reduced diameter portion thereof being received by the opening 29 and being welded therein as also illustrated in FIG. 2. The other ends of the bars 23 and 27 are each provided with a semicircular cutout portion which is adapted to receive the end of a hollow bearing 31. Bars 23 and 27 are secured to hollow bearing 31 by means of welding or the like. A vertically disposed shaft 33 is rotatably mounted in bearing 31 and is prevented from downward movement with respect thereto by means of a ring 35 welded to the exposed upper end thereof. A pair of spaced-apart plates 37 and 39 are secured to the exposed lower end of shaft 33 by welding or the like as best illustrated in FIG. 3. An upstanding V-shaped stop means 41 is welded to the upper surface of plate 37 adjacent the forward end thereof as best seen in FIG. 1. It can be seen that the free ends of stop means 41 will engage the end of the bar 27 to limit the rotational movement of shaft 33 with respect to bearing 31 in two directions.

A plate member 43 is welded to one side of plates 37 and 39 and has a forward portion 45. The numeral 47 generally designates a spacer which is positioned laterally of plate member 43 while the numeral 49 generally designates a plate member which is secured to the spacer 47 and the plate member 43 by means of a bolt assembly 51 extending therethrough as illustrated in FIG. 1. The numeral 53 generally designates a disc support arm which is pivotally connected to the plate members 43 and 49 by means of bolt assembly 55 and is positioned therebetween as illustrated in the drawings. As seen in FIG. 5, the upper end of the disc support arm 53 is positioned below the spacer 47 and has an arcuate upper end portion 57 which permits the arm 53 to be pivoted about bolt assembly 55.

A latch 59 is positioned between the plate members 43 and 49 adjacent the rearward ends thereof and is pivotally connected thereto at its upper end by means of pin 61. As seen in FIG. 5, the lower rearward end of spacer 47 is provided with a notch 62 which partially receives the curved upper end of the latch 59. As seen in FIG. 5, the lower end of the latch 59 is curved and the numeral 63 generally designates the juncture of the curved lower end and the straight side thereof for purposes of description. An ear member 65 is welded to the lower end of the latch 59 and extends laterally therefrom as best illustrated in FIG. 1. As seen in FIG. 2, an ear member 67 is secured to the lower forward end of plate member 49 by welding and extends laterally therefrom. A spring means 69 is secured at its forward end to ear member 67 and at its rearward end to ear member 65 to yieldably resist the counterclockwise pivotal movement (as viewed in FIG. 5) of latch 59. The numeral 77 generally designates an arcuate notch formed in arm 53 which is adapted to receive the lower rearward end of latch 59 at times as illustrated in FIG. 2.

A spindle 79 is received by a suitable opening in the lower end of arm 53 and is welded therein as illustrated in FIG. 2. A conventional hub means 81 is rotatably mounted on spindle 79 and has a disc member 83 operatively secured thereto. Hub means 81 should be of the sealed type to prevent dust from entering the bearings therein. Additionally, the bearing 31 should have a suitable grease fitting 85 provided thereon.

Colter 19 is mounted in clamp 11 by simply removing U-bolt 13 and causing clamp members 15 and 17 to embrace shaft 21 between bars 23 and 27. U-bolt 13 is then extended through clamp members 15 and 17 and secured to plow beam 10. Preferably, the length of shaft 21, that is, the distance between bars 23 and 25, should be somewhat greater than the vertical height of clamp 11 to permit vertical adjustment of the plow colter with respect to the clamp 11. Shaft 21 may be selectively rotated with respect to clamp 11 at times to permit the lateral movement of the plow colter to properly align the disc member 83 with the plowshare mounted on the plow. When a shaft 21 has been rotated to its desired position with respect to clamp 11, U-bolt 13 is then tightened to prevent further rotational movement therebetween. If subsequent rotational or vertical adjustment between shaft 21 and clamp 11 is necessary, U-bolt 13 may be simply loosened and the adjustment performed. It can be appreciated that upon the loosening of clamp 11, shaft 21 has a tendency to move downwardly with respect thereto. In conventional plow colters, the mounting shaft simply falls from the beam clamp upon the loosening thereof. However, in this device, downward movement of shaft 21 is prevented by bar 23 engaging the upper end of clamp 11 which prevents the plow colter from falling from the plow beam.

Stop means 41 limits the rotational movement in two directions of shaft 33 with respect to bearing 31 due to the engagement of the rearward ends of stop means 41 with the projecting forward ends of bar 27. Stop means 41 prevents undesired wabbling of the plow colter with respect to the plow beam.

In normal operation, the disc support arm 53 is positioned in the relationship illustrated in FIG. 2. The tension of the spring means 69 causes the latch 59 to be moved into engagement with the notch 77 in the arm 53. The latch 59 is urged into engagement with the notch 77 by the spring means 69 due to the fact that the spring force is exerted on the lower end of the latch 59 while the latch 59 is pivoted at its upper end. When the disc 83 strikes a rock 87, sufficient resistance will be encountered by the disc 83 so that sufficient upward force will be imposed upon the arm 53 to overcome the force of the spring means 69 maintaining the latch 59 in the notch 77. When the upward force imposed in the arm 53 overcomes the spring force of the spring means 69, the latch 59 is pivoted about pin 51 out of engagement with the notch 77 so that the disc 83 can pass over the rock 87 without damage to the structure. As soon as the disc 83 has passed over the rock 87, the force of the spring means against the lower end of the latch 59 will cause the latch 59 to pivot the arm 53 downwardly and forwardly until the lower end of the latch is received by the notch 77. In effect, the latch 59 and spring means 69 act as a spring-loaded locking means to maintain the arm 53 in an operative condition until a rock or the like is struck by the disc 83. The spring-loaded locking means is overcome when sufficient resistance is encountered by the disc 83 to permit the disc to move upwardly over the object without damaging the equipment. If desired, the lower rearward end of the latch 59 and the notch 77 may be provided with serrated surfaces to increase the frictional engagement therebetween to further increase the amount of force necessary to disengage the latch 59 from the notch 77. The spring-loaded locking means permits the pivotal movement of the arm 53 as described above without the necessity of constantly replacing shearpins which would be sheared upon the disc 83 striking a rock.

As seen in FIG. 2, the upper end of the arm 53 is substantially tapered and therefore provides as much clearance for the plow colter as is present in the plow itself. Because the upper end of the arm 53 is positioned closely to the horizontal plow beam 10, long weeds, cornstalks and the like will not become entangled therewith. The plow colter 19 is extremely durable in use for several reasons. The substantial length of bearing 31 and shaft 33 creates a large bearing surface therebetween which dissipates the strain over a large surface to prevent any twisting or damage to the mounting means. The long bearing means also insures that the plow colter will caster easily. The design of plow colter 19 is such that it may be quickly and easily secured to any make or type of plow. Thus it can be seen that the device accomplishes at least all of its stated objectives.

Some changes may be made in the construction and arrangement of my plow colter without departing from the real spirit and purpose of my invention, and it is my intention to cover by my claims, any modified forms of structure or use of mechanical equivalents which may be reasonably included within their scope.

I claim:
1. In a colter assembly for a plow having a beam means, said plow having rearward and forward ends,
   a hollow bearing means operatively secured to said beam means and having upper and lower ends,
   a shaft rotatably mounted in said bearing means and having upper and lower ends,
   a support means operatively secured to said shaft adjacent the lower end thereof,
   a disc support arm operatively pivotally secured adjacent its upper end to said support means, said disc support arm being pivotally movable from first to second positions,
   said disc support arm having a disc means rotatably secured at its lower end,
   said disc support arm normally extending downwardly and rearwardly from said support means,
   said disc support arm having a notch formed therein adjacent its upper rearward end,
   a spring-loaded latch means having upper and lower ends and being operatively pivotally secured at its upper end to said support means and having its lower end normally received by said notch,
   said spring-loaded latch means maintaining said disc support arm in its first position until a predetermined force is applied to said disc means to overcome the force of said spring-loaded latch means, said disc support arm pivotally moving upwardly to its second position when said predetermined force is applied to said disc means, said disc support arm being returned to its first position by said spring-loaded latch means after said predetermined force is removed from said disc means,
   said support means comprising a plate means having first and second plate members positioned on opposite sides of the upper end of said support arm, one of said plate members being rigidly secured to said shaft,
   said latch means being pivotally connected to said plate members and being positioned therebetween rearwardly of the upper end of said support arm,
   said notch receiving at least a portion of the lower end of said latch means therein and being normally positioned below and rearwardly of the pivotal connection of said latch means,
   said spring-loaded latch means including a spring means connected to and extending between said plate means and said latch means to normally urge said lower end of said latch means downwardly into said notch.

2. The assembly of claim 1 wherein said latch means has a first ear member secured thereto and extending laterally therefrom, said other plate member having a second ear member secured thereto and extending laterally therefrom, said spring means secured to and extending between said ear members.

3. The assembly of claim 2 wherein said spring means is secured at its rearward end to said first ear member at a point rearwardly and below the pivotal axis of said latch means and is secured at its forward end to said second ear member at a point forwardly and below the pivotal axis of said latch means.

4. The assembly of claim 3 wherein said support arm extends downwardly and rearwardly from its pivotal connection to said plate means, said notch being disposed below and rearwardly of the pivotal connection of said support arm when said support arm is in its first position.